United States Patent
Donald et al.

(10) Patent No.: US 6,306,994 B1
(45) Date of Patent: Oct. 23, 2001

(54) INKS WITH ENHANCED SUBSTRATE BINDING CHARACTERISTICS

(75) Inventors: Dennis Scott Donald; Walter Raymond Hertler, both of Kennett Square; Sheau-Hwa Ma, Chadds Ford, all of PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/312,225

(22) Filed: May 14, 1999

(51) Int. Cl.$^7$ ............................ C08F 20/06; C08F 20/30
(52) U.S. Cl. ............... 526/317.1; 526/318; 526/318.41; 526/320; 526/326; 526/329.7; 526/332
(58) Field of Search ..................... 106/31.13, 31.28, 106/31.97; 523/160; 526/317.1, 318, 318.1, 319, 916, 307.6, 307.7, 318.41, 320, 326, 329.7, 332

(56) References Cited

U.S. PATENT DOCUMENTS

| | | | |
|---|---|---|---|
| 5,053,495 | 10/1991 | Greenwood et al. | 534/829 |
| 5,085,698 | * 2/1992 | Ma et al. | 106/20 |
| 5,102,448 | 4/1992 | Parton et al. | 106/22 |
| 5,203,912 | 4/1993 | Greenwood et al. | 106/22 K |
| 5,221,334 | 6/1993 | Ma et al. | 106/20 D |
| 5,272,201 | * 12/1993 | Ma et al. | 524/505 |
| 5,648,405 | * 7/1997 | Ma et al. | 526/160 |
| 6,011,098 | * 1/2000 | Kashiwazaki et al. | 524/377 |

* cited by examiner

Primary Examiner—David W. Wu
Assistant Examiner—R. Harlan
(74) Attorney, Agent, or Firm—Joseph A. Tessari

(57) ABSTRACT

The present invention relates to block copolymer dispersants comprising a hydrophobic block and a hydrophilic block having at least one polymerized monomer including a primary amine functionality. The inventive block copolymer dispersant is used to make aqueous dispersants such as inks that have enhanced paper binding characteristics.

12 Claims, No Drawings

INKS WITH ENHANCED SUBSTRATE BINDING CHARACTERISTICS

FIELD OF THE INVENTION

The present invention relates to polymer dispersants having a polymerized monomer including a primary amine functionality, inks comprising such polymer dispersants, and processes of making the same.

BACKGROUND OF THE INVENTION

Ink jet printers are relatively inexpensive machines using non-impact methods to print. Print quality refers to characteristics, such as print sharpness, and is dependent, in part, on the mechanical design of ink jet printers and inks used during printing processes. The physical and chemical characteristics of inks, which affect print quality, may be altered by factors such as solvents, colorants and/or other ink additives. Colorants provide tints to inks and refer to dyes, dispersed dyes, or pigments. Dyes refer to colorants that are soluble during ink formation and printing. Pigments refer to colorants that are insoluble during ink formation and printing. Dispersed dyes refer to colorants that are insoluble during ink formation but become soluble some point during a printing process. Print quality is enhanced when colorants, such as pigments, are well dispersed in inks.

Dispersants attached to insoluble particles enhance the dispersion of insoluble particles in liquids and are sometimes characterized as one or more blocks of polymerized monomers. Hydrophobic blocks, which include polymerized monomers hydrophobic in nature, are involved in the binding of polymer dispersants to insoluble particles. Group transfer polymerization (GTP), can not be used to prepare block copolymers when monomers containing active hydrogens of the type present in primary amines are used as starting materials. Consequently, U.S. Pat. No. 5,272,201 (Ma et al.) discloses the use of a specific initiator for placing a monomer including an amine group at the beginning of a hydrophobic block and a method that forms a hydrophobic block with one or more tertiary amine groups placed within the ends of the hydrophobic block. Polymer dispersants disclosed in U.S. Pat. No. 5,272,201, have in addition to a hydrophobic block, a hydrophilic block that facilitates polymer dispersants' interactions with surrounding liquids. Consequently, a hydrophobic and a hydrophilic block each provide unique characteristics to a polymer dispersant. Modifications made to a hydrophobic block may affect the characteristics of a polymer dispersant differently than modifications made to a hydrophilic block, with each block playing a different role in the dispersion of insoluble particles (attachment versus liquid interaction).

Having a well dispersed ink prevents agglomeration, and settling to the bottom of a pigment, during the printing process. Other ink characteristics include the ability of an ink to bind to paper. Inks that bind well to paper are especially suited for specific applications such as use in high speed ink jet printers because they prevent smearing especially when the printed ink is touched by subsequent printed pages. The ability of an ink to bind to a substrate may be measured by a waterfastness test. An ink drop is applied to a substrate (such as paper) to form a spot. After a specific period of time, the substrate and ink are placed in contact with water. The substrate and ink are visually inspected to determine if the spot, formed by the drop of ink, smears in the presence of water. Another test for measuring the strength of ink binding to a substrate is called the mechanical smear test that requires rubbing the surface of a printed ink with a highlighter.

SUMMARY OF THE INVENTION

The present invention provides aqueous dispersions, preferably smear-resistant inks, having enhanced substrate binding characteristics. These aqueous dispersions comprise a block copolymer dispersant including a polymerized monomer that has a primary amine functionality. Such a block copolymer dispersant includes a hydrophobic block and a hydrophilic block. The hydrophilic block preferably comprises at least one polymerized monomer including a primary amine functionality, preferably aminoalkyl acrylates, aminoalkyl methacrylates, or combinations thereof, and at least one polymerized monomer including a carboxylic acid functionality. Inks of the present invention are preferably aqueous and for use in ink jet printers, and comprise in addition to a polymer dispersant, an aqueous carrier and a colorant.

The present invention also provides an article comprising a substrate, having a first and second major outer surface. Attached to the substrate is a layer of an aqueous dispersion, preferably an aqueous ink, comprising a colorant and a polymer dispersant of the present invention.

The present invention also provides for a monomer having a protected primary amine functionality, N-(2-methyacryloxyethyl)-2,2,5,5-tetramethyl-2,5-disilapyrrolidone. This monomer having a protected primary amine functionality is preferably used in a group transfer polymerization method to produce block copolymer dispersants, which have one or more polymerized monomers including a primary amine functionality.

DETAILED DESCRIPTION OF THE INVENTION

Inventive block copolymer dispersants preferably have a diblock or a triblock structure with one or more monomers having a primary amine functionality, preferably associated with the hydrophilic block. Aqueous dispersions such as inks comprising such polymer dispersants are observed to have enhanced binding to a substrate, such as paper, as illustrated in the examples hereinafter, and may be used in ink jet printers, preferably thermal ink jet printers. The aqueous dispersions of the present invention may also be suitable for other applications such as paints or protective coatings. Aqueous dispersions used as inks may be adapted to the requirements of a particular ink jet printer, such as to provide a balance of light stability, smear resistance, viscosity, surface tension, optical density, and pluggage resistance as desired for the particular application.

Polymer Dispersants

Block copolymer dispersants of the present invention include a hydrophobic block and a hydrophilic block.

Hydrophilic Block

The hydrophilic blocks in the polymeric dispersants of this invention preferably comprise at least one polymerized monomer including a primary amine functionality and at least one polymerized monomer including a carboxylic acid functionality.

Monomers suitable for incorporating a primary amino group into the hydrophilic block of a block copolymer dispersant, utilizing GTP or ionic polymerization, may best be prepared from primary aminoalky acrylates or salts thereof, primary aminoalkyl methacrylates or salts thereof, or combinations therof. The preferred acrylate used for this application is 2-aminoethyl methacrylate hydrochloride. The active hydrogens of the primary amino group are first masked (using a silyl protecting group such as 1,2 bis chlorodimethylsilyl ethane), as described herein, to prevent interference with the polymerization process. An example of a novel monomer prepared from 2-aminoethyl methacrylate hydrochloride with the primary amino suitably masked so that there are no active hydrogens is N-(2-methacryloxyethyl)-2,2,5,5-tetramethyl-2,5-disilapyrrolidone. After the block copolymer is prepared by GTP or anionic polymerization, the silyl protecting group is removed by methanolysis or hydrolysis to form a hydrophilic block, which now contains one or more primary amine groups randomly distributed within that hydrophilic block.

A polymerized monomer including an amine functionality may be prepared from monomer(s) free of a primary amine functionality that include a reactive functionality capable of being converted into a primary amine functionality after the hydrophilic block is formed. It is preferred that one or more polymerized monomer(s) including an amine functionality are located between the ends of a hydrophilic block. Alternatively a polymerized monomer including an amine functionality may be located exclusively at one or both ends of a hydrophilic block with the rest of the hydrophilic block including polymerized monomers free of a primary amine functionality or containing one or more polymerized monomers including an amine functionality.

A hydrophilic block in accordance with this invention preferably includes at least one polymerized monomer including a carboxylic acid functionality. Polymerized monomers including a carboxylic acid functionality are prepared, in part, from monomers such as acrylic acid, methacrylic acid, crotonic acid, itaconic acid, itaconic acid monoester, maleic acid, maleic acid monoester, fumaric acid, fumaric acid monoester, or combinations thereof. Some methods of making a hydrophilic block including polymerized monomers including a carboxylic acid functionality are the anionic or group transfer polymerization methods. When these methods are used, it is preferred that carboxylic acid functionalities are attached to protective group prior to polymerization as described above for monomers including the amine functionality. The blocking groups are then removed after polymerization is completed by methanolysis or hydrolysis. Examples of monomers with blocked carboxylic acid functionality suitable for the practice of the present invention include trimethylsilyl acrylate, trimethylsilyl methacrylate, 1-butoxyethyl acrylate, 1-butoxyethyl methacrylate, 1-ethoxyethyl acrylate, 1-ethoxyethyl methacrylate, 2-tetrahydropyranyl acrylate, and 2-tetrahydropyranyl methacrylate. Upon the removal of the blocking group, after the completion of the polymerization process, polymers including acrylic or methacrylic acid are generated.

A hydrophilic block may also include polymerized ethylenically unsaturated monomers prepared from monomers such as alkyl acrylates and alkyl methacrylates, each having alkyl groups comprising 1–12 carbons. These ethylenically unsaturated monomers include methyl acrylate, methyl methacrylate, ethyl acrylate, ethyl methacrylate, butyl acrylate, butyl methacrylate, acrylamides, methacrylamides or combinations thereof. These monomers may be copolymerized into the hydrophilic portion provided they are used at a concentration that will not significantly reduce the solubility of the resulting hydrophilic block.

A hydrophilic block may also include one or more polymerized monomers prepared from monomers of the general formula $$CH_2=C(R_3)(C(O)OX_n(CH_2CH_2O)_m)-R_4$$

wherein n=0 or 1; when n=1, X is an akyl, aryl, or alkaryl diradical connecting group of 1–9 carbon atoms; m=1–50, $R_3$ is H or $CH_3$, and $R_4$ is selected from the group consisting of H and alkyl group of 1–4 carbon atoms. Examples of such monomers include 2-hydroxyethyl acrylate, 2-hydroxyethyl methacrylate, hydroxypropyl acrylate, 2-(2-methoxyethoxy) ethyl acrylate, 2-(2-methoxyethoxy)ethyl methacrylate, ethoxytriethyleneglycol methacrylate, methoxy polyethyleneglycol (molecular weight of 200–1000) monomethacrylate, polyethyleneglycol (molecular weight 200–1000) monomethacrylate.

It is preferred that a hydrophilic block comprises about 10 mole percent to about 50 mole percent of one or more polymerized monomers including an amine functionality, and about 50 mole percent to about 90 mole percent of one or more polymerized monomers including a carboxylic acid functionality. A hydrophilic block of the present invention has a number average molecular weight of about 300 to about 10,000 and preferably about 500 to about 5,000.

Hydrophobic Block

A block copolymer dispersant of the present invention includes a hydrophobic block. The hydrophobic block comprises one or more polymerized ethylenically unsaturated monomers prepared from monomers such as alkyl esters of acrylic acid, alky esters of methacrylic acid, aryl esters of acrylic acid, aryl esters of methacrylic acid, N-alkyl acrylamides, N-alkyl methacrylamides, N-aryl acrylamide, N-aryl methacrylamide, vinyl alkyl esters, vinyl aryl esters or combinations thereof. The term "alkyl" and "aryl" includes substituted alkyl, substituted aryl, substituted alkyaryl, unsubstituted alkyl, unsubstituted aryl, and unsubstituted alkyaryl groups. The term "substituted" in combination with alkyl, aryl or alkylaryl is used herein to mean an alkyl or aryl group that contains one or more substituents that do not interfere with the polymerization process. Such substituents may include alkyl, hydroxy, amino, ester, acid, acyloxy, amide, nitrile, halogen, haloalkyl, alkoxy. Other ethyleneically unsaturated monomers used in the practice of the present invention include: methyl acrylate, ethyl acrylate, n-butyl acrylate, 2-ethylhexyl acrylate, methyl methacrylate, ethyl methacrylate, n-butyl methacrylate, t-butyl methacrylate, 2-ethylhexyl methacrylate, cyclohexyl methacrylate, phenyl acrylate, phenyl methacrylate, benzyl acrylate, benzyl metahcrylate, 2-phenylethyl acrylate, 2-phenyethyl methacrylate, 2-phenoxyethyl acrylate, 2-phenoxyethyl methacrylate, 1-naphthalyl acrylate, 2-naphthalyl acrylate, 2-naphthalyl acrylate, p-nitrophenyl acrylate, p-nitrophenyl methacrylate, phthalimidomethyl acrylate, phthalimidomethyl methacrylate, N-phenyl acrylamide, N-phenyl methacrylamide, N-benzyl acrylamide, N-benzyl methacrylamide, N-(2-phenylethyl) acrylamide, N-(2-phthalimidoethoxymethyl) acrylamide, styrene, alpha-methyl styrene, vinyl acetate, vinyl butyrate, vinyl benzoate, or combinations thereof.

Hydrophobic blocks may include one or more polymerized hydrophilic monomers for purposes of modifying physical properties of a block copolymer dispersant, such as glass transition temperature characteristics. Preferably, a hydrophobic block will comprise, by weight, about 1% to about 20% of a polymerized hydrophilic monomer. It is preferred that a hydrophobic block comprise 1% to about 10%, by weight, of a polymerized hydrophilic monomer. In addition, hydrophobic blocks may contain from about 1% to about 20%, by weight, of a polymerized monomer having a functional group which enhances the block copolymer dispersant binding to a pigment. For example, a hydrophobic block may include a polymerized monomer including an amine functionality. Polymerized monomers including an amine functionality may be prepared from a monomer such as N,N-dimethylaminoethyl acrylates. A block copolymer dispersant comprising a hydrophobic block comprising N,N-dimethylaminoethyl acrylate may have enhanced binding to a pigment (especially a pigment including an acidic group on its surface, for example). A hydrophobic block may include one or more polymerized monomer including an acid group prepared from monomers including an acid group, such as 2-acrylamido-2-propane sulfonic acid and may have enhanced binding to pigments having basic groups on their surface.

A hydrophobic block may also include one or more polymerized monomers prepared from monomers of the general formula

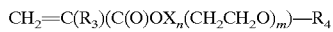

wherein n=0 or 1; when n=1, X is an akyl, aryl, or alkaryl diradical connecting group of 1–9 carbon atoms; m=1–50, $R_3$ is H or $CH_3$, and $R_4$ is elected from the group consisting of H and alkyl group of 1–4 carbon atoms. Examples of such monomers include 2-hydroxyethyl acrylate, 2-hydroxyethyl methacrylate, hydroxypropyl acrylate, 2-(2-methoxyethoxy) ethyl acrylate, 2-(2-methoxyethoxy)ethyl methacrylate, ethoxytriethyleneglycol methacrylate, methoxy polyethyleneglycol (molecular weight of 200–1000) monomethacrylate, polyethyleneglycol (molecular weight 200–1000) monomethacrylate.

A hydrophobic block of the present invention h as a number average molecular weight of about 300 to about 10,000 and preferably about 500 to about 5,000.

Tuning Block

Block copolymer dispersants may comprise a tuning block for modifying physical properties of a block copolymer dispersant such as solubility and glass transition temperature. The tuning block has a composition of polymerized monomers unlike that of the hydrophobic and the hydrophilic block. Preferably, a tuning block comprises at least one polymerized monomer prepared from monomers of the general formula

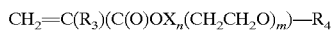

wherein n=0 or 1; when n=1, X is an akyl, aryl, or alkaryl diradical connecting group of 1–9 carbon atoms; m=1–50, $R_3$ is H or $CH_3$, and $R_4$ is selected from the group consisting of H and alkyl group of 1–4 carbon atoms. Examples of such monomers include 2-hydroxyethyl acrylate, 2-hydroxyethyl methacrylate, hydroxypropyl acrylate, 2-(2-methoxyethoxy) ethyl acrylate, 2-(2-methoxyethoxy)ethyl methacrylate, ethoxytriethyleneglycol methacrylate, methoxy polyethyleneglycol (molecular weight of 200–1000) monomethacrylate, polyethyleneglycol (molecular weight 200–1000) monomethacrylate. The composition of the tuning block may include both hydrophobic polymerized monomers, hydrophilic polymerized monomer and may include one or more of the monomers used to prepare the hydrophilic and hydrophobic blocks.

A tuning block of the present invention has a number average molecular weight of about 300 to about 10,000 and preferably about 500 to about 5,000.

Block Copolymer Dispersant Structure

Block copolymers have a specified order of blocks. For example, diblock copolymers comprise A and B blocks and a triblock copolymer comprise A, B and C blocks or A, B and A blocks. Preferably, the A and C blocks are the end blocks in triblock copolymers having the structure ABA and ABC. It is preferred that a block copolymer dispersant comprise a diblock copolymer structure comprising an A block comprising a hydrophilic stabilizing block and a B block comprising a hydrophobic block, or vice versa.

A block copolymer dispersant of the present invention may have a triblock copolymer structure wherein the block copolymer has an ABC structure. The ABC structure preferably consists of a hydrophilic block, a hydrophobic block, and a tuning block, with the hydrophobic block being interposed between the hydrophilic block and the tuning block. A block copolymer dispersant of the present invention may have a triblock copolymer structure wherein the block copolymer has a structure consisting of an A block, a B block and an A block (ABA structure). An ABA structure preferably consists of the hydrophilic block, the hydrophobic block, and a second hydrophilic block, the hydrophobic block is interposed between the hydrophilic block and the second hydrophilic block.

Methods of Making Block Copolymers

The preferred process of making a block copolymer dispersant of this invention is one in which monomers, selected for a particular block, are added to a growing polymer chain sequentially so that the hydrophilic, hydrophobic and the tuning block are formed as specific monomers are added to a single polymer chain. Such block copolymer dispersants of the present invention are prepared using the group transfer method reported in Webster in J. Amer. Chem. Soc., 1983, 105, 5706; the anionic polymerization method reported in Morton in "Anionic Polymerization: Principles and Practice", Academic Press, N.Y., 1983; or the ring-opening polymerization method as reported in "Ring Opening Polymerization", N.Y., 1984; Vol. 1, p. 461.

Block copolymer dispersants of the present invention may also be prepared by a polymerization method in which a block is prepared and then used to sequentially build the block copolymer dispersant. The block may be a hydrophobic, hydrophilic or tuning block. The method begins by preparing a block with a terminal polymerizable double bond by using a free radical polymerization method employing cobalt (II) and cobalt (III) complexes as catalytic chain transfer agents. The cobalt complexes are preferred because they effectively control the molecular weights of the block produced and produced a greater amount of block. Preferred cobalt chain transfer agents are disclosed in U.S. Pat. No. 4,680,352 (Janowicz et al.) and U.S. Pat. No. 4,722,984 (Janowicz). The cobalt chain transfer agent can be employed in a concentration range of approximately $1 \times 10^{-8}$ M to $5 \times 10^{-3}$ M. The optimal concentration is dependent on the desired molecular weight of the block and can be obtained through routine experimentation by one skilled in the art.

The block formed is then copolymerized with monomers selected for the second block preferably by a free radical polymerization method to form an AB block copolymer with a terminal double bond. The molecular weight or the size of the second block is determined by the relative molar ratio to the first block. This AB block copolymer may then be used in a polymerization process with monomers selected for a third block to form ABA or ABC block copolymers.

Block copolymer dispersants of the present invention may be modified prior to use. For example, the solubility of block copolymer dispersant in an aqueous carrier medium may be increased by neutralizing the ionizable groups of the block copolymer dispersant. The carboxylic acid functionality is an ionizable group capable of being neutralized with a base to form an anion. The block copolymer dispersant of the present invention is preferably an anionic dispersant. Examples of useful bases used to neutralize the ionizable groups include alkali metal hydroxides (such as lithium, sodium, and potassium hydroxide), alkali metal carbonate and bicarbonate (such as sodium and potassium carbonate and bicarbonate), organic amines (such as mono-, di-, tri-methylamine, morpholine, N-methylmorpholine), organic alcohol amines (N,N-dimethylethanolamine, N-methyl diethanolamine, mono-, di-, tri-ethanolamine), ammonium salts (such as ammonium hydroxide, tetra-alkyl mmonium hydroxide), pyridine and combinations thereof. The neutralization of the block copolymer dispersant will form salts of the ionizable groups.

Inks

Aqueous dispersions of the present invention, such as inks include an inventive block copolymer dispersant, a colorant, and an aqueous carrier. The components of an ink of the present invention will now be described.

Colorant

Colorants refer to pigments, dispersed dyes, dyes or combinations thereof, and the preferred colorant is a pigment. Pigments suitable for use in the practice of the present invention are sufficiently small to permit free flow of ink through an ink jet printing device, especially at ejecting nozzles that usually have a diameter ranging from 10 micron to 50 micron. Particle size also has an influence on pigment dispersion stability characteristics, which is critical throughout the life of the ink. Brownian motion of minute particles will help prevent the particles from settling. It is also desirable to use small particles for maximum color strength and gloss. The range of useful particle size is approximately 0.005 micron to 15 micron. Preferably, the pigment particle size should range from 0.005 to 5 micron and most preferably, from 0.01 to 0.3 micron. The pigment may be used in dry or wet form such as presscakes.

Useful pigments for the practice of the present invention include a wide variety of organic and/or inorganic pigments, alone or in combination. In the case of organic pigments, the ink may contain up to approximately 30% pigment by weight, but will generally be in the range of approximately 1 to 15%, preferably approximately 1 to 8%, of the total weight of the ink composition for most ink jet printing applications such as thermal inkjet printing applications. If an inorganic pigment is selected, the ink will tend to contain higher weight percentages of the pigment than with comparable inks employing organic pigment, and may be as high as approximately 50 weight % because inorganic pigments generally have higher specific gravities than the organic pigments.

Fine particles of metal or metal oxides also may be used as colorants. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

The characteristics of a colorant are taken into consideration when choosing the other components of an ink. For example, pigments such as carbon blacks have on their surface chemisorbed oxygen complexes, primarily acidic in nature, such as carboxylic, quinonic, lactonic or phenolic groups. These acidic groups provide binding sites for block copolymer dispersants having hydrophobic groups with basic functions such as amines. Therefore, it is preferred that block copolymer dispersant comprising hydrophobic colorant binding blocks including amines are chosen when carbon black is the colorant of an ink. Other pigments may have basic groups on their surface and it would be preferred that a block copolymer dispersant comprise hydrophobic colorant binding blocks including acidic groups to enhance binding of the block copolymer dispersant to the pigment. The surface of colorants may also be modified chemically by compounds containing functional groups such as sulfonic, phosphoric, carboxylic acid groups or amine (basic) groups to provide colorants with specific binding sites for block copolymer dispersants. Consequently, a hydrophobic colorant binding block may be prepared from monomers that will attach well to the modified surface of the colorant. Other types of block copolymer dispersant/colorant interactions include dipole-dipole interactions since most organic color pigments characteristically have surface aromatic features.

The color and amount of disperse dye used in an ink is primarily dependent upon the desired color of the print achieved, the purity of the dispersed dye, and the strength of the dispersed dye. Low concentrations of dispersed dye may not give adequate color vividness. High concentrations of dispersed dye may result in poor print head performance or unacceptably dark colors. The disperse dye may be present in the amount of 0.01 to 20%, by weight, preferably 0.05 to 8%, by weight, more preferably 1 to 5%, by weight, based on the total weight of the ink. Disperse dyes that may be useful in this invention are disclosed in U.S. Pat. Nos. 5,053,495 (Greenwood et al.), 5,203,912 (Greenwood et al.), and 5,102,448 (Greenwood et al.).

Aqueous Carriers

Aqueous carriers used to make inks of the present invention comprise water, or a mixture of water and at least one water soluble organic solvent. Deionized water is the preferred aqueous carrier when the aqueous carrier is substantially free of an organic solvent. Deionized water and a water soluble organic solvent having at least 2 hydroxyl groups, e.g., diethylene glycol is the preferred aqueous carrier when the aqueous carrier is a mixture of water and at least one water soluble organic solvent. Examples of water-miscible organic solvents suitable for use in the practice of the present invention are disclosed in U.S. Pat. No. 5,085,698 (Ma et al.). Water soluble organic solvents may be selected for purposes of modifying the surface tension and viscosity of an ink, being compatible with a selected pigment, modifying ink dry time, and being compatible with the type of media substrate onto which the ink will be printed. An aqueous carrier comprising water and a water soluble organic solvent comprises by weight percent, between 30% and 95% of water, preferably 60% to 95% of water and between 5% and 60% of water soluble organic solvent, preferably 5% and 30% of a water soluble organic solvent The aqueous carrier is in the range of about 70 to about 99.8% of an ink, preferably about 94% to about 99.8%,based on total weight of the ink when an organic pigment is selected. The aqueous carrier is in the range of approximately about 25 to about 99.8% of an ink, preferably about 70% to about 99.8% when an inorganic pigment is selected.

Ink Additives

Various types of aqueous additives may be combined with ink formulations of the present invention to modify the properties such as viscosity. Examples of additives include, coalescing agents, polymeric binders (such as water dispersible latex emulsions), thickeners, thixotropic agents, surfactants, coating aids, biocides, sequestering agents, etc.

When the inks of the present invention are used in ink jet printers, anionic, cationic, nonionic, or amphoteric surfactants may be present in the amount of 0.01–5% and preferably 0.2–2%, based on the total weight of the ink. Examples of useful surfactants are disclosed in U.S. Pat. No. 5,221,334 (Hochberg et al.). Biocides may be added to inks of the present invention such as DOWICIDE, commercially available from Dow Chemical, of Midland, Mich.; NUOSEPT commercially available from Huls America, Inc., of Piscataway, N.J.; OMIDINES commercially available from Olin Corp. of Cheshire, Conn.; NOPCOCIDES commercially available from Henkel Corp. of Ambler, Pa., TROYSANS commercially available from Troy Chemical Corp. of Newark, N.J., sodium benzoate; or combinations thereof. Other additives such as sequestering agent (such as EDTA), humectants, and viscosity modifiers may also be added to improve various properties of the ink compositions.

Method of Making Inks

The ink compositions of the present invention are prepared in the same manner as other ink compositions used in ink jet printers. Preferably, the pigment dispersion is prepared by premixing the selected pigments(s), the block copolymer dispersant and aqueous carrier. The dispersion step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium. It is generally desirable to make the pigmented ink jet ink in concentrated form, which is subsequently diluted with a suitable liquid to the appropriate concentration for use in the ink jet printing system. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Pigmented ink jet inks suitable for use with ink jet printing systems should have a surface tension in the range of about 20 dyne/centimeter to about 70 dyne/centimeter and, more preferably, in the range 30 dyne/centimeter to about 70 dyne/centimeter at 20 ° C. as measured by a ring method. Acceptable viscosities are no greater than 20 centipoise, and preferably in the range of about 1.0 centipoise to about 10.0 centipoise at 20 ° C. using a conventional viscometer. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers.

The inks have excellent storage stability for a long period and do not clog in an inkjet apparatus. Fixing the ink on the media substrate, such as paper, fabric, film, etc., can be carried out rapidly and accurately. The printed ink images have clear color tones, high density, excellent water resistance and lightfastness. Furthermore, the inks are compatible with the ink jet printing apparatus and they are essentially odorless.

The block copolymer dispersant is present in the range of approximately 0.1 to 30% by weight of the total ink composition, preferably in the range of 0.1 to 8% by weight of the total ink composition. If the amount of polymer is too high, it tends to increase the viscosity of the ink. Dispersion stability is affected if insufficient block polymer is present.

Articles

The present invention also provides an article comprising a substrate, having a first and second major outer surface. Attached to a substrate is a layer of an aqueous dispersion, preferably ink, comprising a colorant and a block copolymer dispersant of the present invention. A substrate includes paper, plastic, wood, metal, glass, textiles or a combination thereof, for example. The aqueous dispersion may be applied to a substrate by spraying, brushing, dipping, or other application techniques known by one skilled in the art. The layer of aqueous dispersion may be attached to the entire surface of the substrate, attached only to he first major surface of the substrate or attached to only the second major surface of the substrate. The layer of aqueous dispersion may be a contiguous or a noncontiguous layer.

EXAMPLE

The examples below are carried out using standard techniques, which are well known and routine to those skilled in the art, except where otherwise described in detail. The examples are illustrative, but do not limit the invention.

Block Copolymer Dispersant 1

Block Copolymer Dispersant 1 is a control dispersant having an AB block structure and a hydrophilic block free of a polymerized monomer containing an amine functionality. Block Copolymer Dispersant 1 maybe described as Poly (methacrylic acid) [10.8 mole percent]-co-poly (ethoxytriethyleneglycolmethacrylate)[3.3 mole percent]-b-poly(benzyl methacrylate) [10 mole percent]

The first block of Block copolymer Dispersant 1 was prepared by adding dropwise to a solution [1.80 g (2.0 mL, 7.68 mmol) of 1,1-bis(trimethylsiloxy)-2-methyl-1-propene (Witco Co., Organosilicone Group, NY, N.Y.) and 0.3 mL of tetrabutylammonium m-chlorobenzoate (1.0 Molar in acetonitrile) in 40 mL of tetrahydrofuran (Aldrich Chemical Co., Milwaukee, Wis.)] a mixture of 12.2 g (13.8 mL, 78 mmol) of trimethylsilyl methacrylate (Witco Co., Organosilicone Group, NY, N.Y.) and 6.4 g (6.4 mL, 26 mmol) of ethoxytriethyleneglycol methacrylate (Rohm Tech Inc., Malden, Mass., purified by passage over a column of basic alumina under nitrogen). The temperature gradually rose from 24° C. to 43.7° C. The second block of Block Copolymer Dispersant 1 was then prepared by the additional 0.2 mL of tetrabutylammonium m-chlorobenzoate (1.0 M in acetonitrile). The reaction mixture was stirred for 15 minutes. Then 13.6 g (13.0 mL, 76 mmol) of benzyl methacrylate (Rohm Tech Inc., Malden, Mass., purified by passage over a column of basic alumina under nitrogen) was dropwise added, and the temperature rose from 35° C. to 54° C. An additional 0.2 mL of tetrabutylammonium m-chlorobenzoate (1.0 M in acetonitrile) was added. The reaction mixture was stirred for 2 hours and then treated with 25 mL of methanol (Aldrich Chemical Co., Milwaukee, Wis.), and the reaction mixture gelled and then dissolved immediately. The solution was concentrated under reduced pressure with a rotary evaporator to provide 26 g of Block Copolymer Dispersant 1, poly(methacrylic acid)$[_{10.8\ mole\ percent}]$-co-poly(ethoxytriethyleneglycol methacrylate)$[_{3.3\ mole\ percent}]$-b-poly(benzyl methacrylate)$[_{10\ mole\ percent}]$.

Block Copolymer Dispersant 2

Block Copolymer Dispersant 2 is an example of a polymer dispersant of the present invention having an AB block structure with a hydrophilic block containing a polymerized monomer including a primary amine functionality. Block Copolymer Dispersant 2 may be described as Poly (methacrylic acid) [10.8 mole percent]-co-poly(2-aminoethyl methacrylate) [3.3 mole percent]-b-poly(benzyl methacrylate) [10 mole percent].

A monomer, N-2-Methacryloxy-2,2,5,5-tetramethyl-2,5-disilapyrrolidone having a protected amino functionality, was prepared. To an oven dried, 1L, 3-necked, round-bottomed flask equipped with mechanical stirring, 500 ml pressure equalizing addition funnel and nitrogen cap, was added, under nitrogen, 200 ml of dry methylene chloride, 48.9 gm (0.227 mole) of 1,2-bis(chlorodimethylsilyl)ethane (Aldrich Chemical Co., Milwaukee, Wis.) and 36.02 gm (0.216 mole) of 2-aminoethyl methacrylate hydrochloride (Polysciences, Inc.). To this well-stirred slurry was added dropwise over a period of one hour at ambient temperature, a solution of 66.7 gm (0.66 mole) of triethylamine in 200 ml of dry methylene chloride. The resulting slurry was stirred at ambient temperature overnight, 25 mg of phenothiazine was added, and the triethylamine hydrochloride was removed by filtration, followed by a rinse with 100 ml of cold methylene chloride into the original filtrate. The filtrate was concentrated on a rotary evaporator, maintaining the bath temperature between 30° C. and 40° C. The thick slurry that was produced, as additional triethylamine precipitated, was taken up in 250 ml of petroleum ether and the resultant slurry was filtered. The filter cake was rinsed twice with 50 ml portions of petroleum ether which were combined with the original filtrate. An additional 25 mg of phenothiazine was added and the petroleum ether was removed on a rotary evaporator, once again keeping the temperature between 30° and 40° C.

The crude product was distilled rapidly through a short vigreux column and the product was collected from 90° C. to 115° C. at a pressure of 0.8 torr in a collection flask to which had been added 25 mg of phenothiazine prior to sample collection. The yield of product was 46.9 gm (80%) of greater than 90% purity. This monomer containing a blocked amine functionality, N-2-Methacryloxy-2,2,5,5-tetramethyl-2,5-disilapyrrolidone, was used to prepare Block Copolymer Dispersant 2.

The first block of Block Copolymer Dispersant 2 was prepared by adding dropwise to a solution [1.8 g (2.0 mL, 7.68 mmol) of 1,1-bis(trimethylsiloxy)-2-methyl-1-propene and 0.3 mL of tetrabutylammonium m-chlorobenzoate (1.0 M in acetonitrile) in 40 mL of tetrahydrofuran] a mixture of 12.2 g (13.8 mL, 78 mmol) of trimethylsilyl methacrylate, 7.0 g (7.4 mL, 26 mmol) of N-(2-methacryloxyethyl)-2,2,5,5-tetramethyl-2,5-disilapyrrolidone (protected monomer), and 6.4 g (6.4 mL, 26 mmol) of ethoxytriethyleneglycol methacrylate (purified by passage over a column of basic alumina under argon). An additional 0.2 mL of tetrabutylammonium m-chlorobenzoate (1.0 M in acetonitrile) was added. The temperature gradually rose from 20° C. to 39° C. The reaction mixture was stirred for 15 minutes. The second block of Block Copolymer Dispersant 2 was then prepared by dropwise adding 13.6 g (13 mL, 76 mmol) of benzyl methacrylate (purified by passage over a column of basic alumina under argon). The temperature rose from 32.5° C. to 44.7° C. Then 0.2 mL of tetrabutylammonium m-chlorobenzoate (1.0 M in acetonitrile) was added and the reaction mixture was stirred for 2 hours. To remove the protective group from the polymerized protected monomer, the reaction mixture was then treated with 25 mL of methanol, upon which the reaction mixture gelled. After addition of 20 drops of 37% hydrochloric acid, the gel started to break up as the protective group was removed. The solution was concentrated under reduced pressure with a rotary evaporator to provide a white precipitate, that was collected by filtration and rinsed thoroughly with diethyl ether to give 34.8 g of Block Copolymer Dispersant 2, poly(methacrylic acid)$_{10.8}$-co-poly(2-aminoethyl methacrylate)$_{3.3}$-co-poly(ethoxytriethyleneglycol methacrylate)$_{3.3}$-b-poly(benzyl methacrylate)$_{10}$. 1H NMR analysis of the product showed the absence of any methlsilyl groups, confirming that deprotection was complete.

Block Copolymer Dispersant 3

Block Copolymer Dispersant 3 is an example of a block copolymer dispersant of the present invention having an ABC structure and a hydrophilic block containing a polymerized monomer including an amine functionality. Block Copolymer dispersant 3 maybe described as poly (methacrylic acid) [13 mole percent]-co-poly(2-aminoethyl methacrylate) [4 mole percent]-b-poly(benzyl methacrylate) [12 mole percent]-b-poly(ethoxytriethyleneglycol methacrylate) [4 mole percent]

The first block of Block Copolymer Dispersant 3 was prepared by adding dropwise to a solution [0.75 g (0.84 mL, 3.2 mmol) of 1,1-bis(trimethylsiloxy)-2-methyl-1-propene and 0.15 mL of tetrabutylammonium m-chlorobenzoate (1.0 M in acetonitrile) in 29 mL of tetrahydrofuran] a mixture of 6.1 g (6.9 mL, 39 mmol) of trimethylsilyl methacrylate and 3.5 g (3.7 mL, 13 mmol) of N-(2-methacryloxyethyl)-2,2,5,5-tetramethyl-2,5-disilapyrrolidone (protected monomer as described in Block Copolymer Dispersant 3). During the addition an additional 0.1 mL of tetrabutylammonium m-chlorobenzoate (1.0 M in acetonitrile) was added. The temperature gradually rose from 22° C. to 38° C. The second block of Block Copolymer Dispersant 3 was prepared by adding 6.8 g (6.5 mL, 38 mmol) of benzyl methacrylate (purified by passage over a column of basic alumina under argon) was added, and the temperature rose from 38° C. to 50° C. The third block of Block CoPolymer Dispersant 3 was prepared by adding 3.2 g (3.2 mL, 13 mmol) of ethoxytriethyleneglycol methacrylate ( purified by passage over a column of basic alumina under argon) was added followed by the addition of 0.05 mL of tetrabutylammonium m-chlorobenzoate (1.0 M in acetonitrile) resulting in a 2° C. exotherm. 1H NMR analysis of a sample of the solution illustrated the sample was free of residual monomers. To remove the protective group from the polymerized protected monomer, the reaction mixture was treated with 10 mL of methanol, and the reaction mixture gelled. Addition of more methanol and heating to 35° C. led to dissolution of the gel as the protective group was removed. After addition of 10 drops of 37% hydrochloric acid, the mixture was stirred at reflux for 3 days. Precipitation with diethyl ether gave 13 g of poly(methacrylic acid)$_{13}$-co-poly(2-aminoethyl methacrylate)$_4$-b-poly(benzyl methacrylate)$_{12}$-b-poly (ethoxytriethyleneglycol methacrylate)$_4$.

Black Pigment Concentrate 1

A black pigment concentrate was prepared by first neutralizing Block Copolymer Dispersant 1 by combining 22.0 g of the Block Copolymer Dispersant 1 with 7.5 g of potassium hydroxide solution (Aldrich Chemical Co., Milwaukee, Wis., 45.5% in deionized water) and 117.2 g of deionized water until a homogeneous 15% polymer solution was obtained. The pH of the block copolymer dispersant solution was 9.0.

44 g of FW18 carbon black (Degussa Corp., Allendale, N.J.), 2.9 g of PROXEL G (Biocide, Zeneca Inc., Wilmington, Del.), and 99.7 g of deionized water was added to the above polymer solution and stirred mechanically for 1 hour. The mixture was processed with a microfluidizer (Microfluidics Corp., Watham, Mass.) by passing it through the interaction chamber 10 times under a liquid pressure of about 10,000 psi. The resulting pigment dispersion had 15% pigment concentration with an average particle size of 102 nm as determined by Brookhaven BI-90 particle sizer.

Black Pigment Concentrate 2

A black pigment concentrate was prepared by first neutralizing Block Copolymer Dispersant 2 by combining 32.0 g of the Block Copolymer Dispersant 2 with 9.7 g of potassium hydroxide solution (45.5% in deionized water) and 171.6 g of deionized water until a homogeneous 10% polymer solution was obtained. The pH of the block copolymer dispersant solution was 9.5.

106.7 g of the polymer solution was mixed with 32 g of FW18 carbon black (Degussa Corp., Allendale, N.J.), 2.13 g of Proxel G (Zeneca Inc., Wilmington, Del.), and 72.5 g of deionized water and stirred mechanically for 1 hour. The mixture was then processed with a microfluidizer (Microfluidics Corp., Watham, Mass.) by passing it through the interaction chamber 10 times under a liquid pressure of about 10,000 psi. The resulting pigment dispersion had 15% pigment concentration with an average particle size of 108 nm as determined by Brookhaven BI-90 particle sizer.

Black Pigment Concentrate 3

A black pigment concentrate was prepared by first neutralizing Block Copolymer Dispersant 3 by combining 11.54 g of the Block Copolymer Dispersant 3 with 3.3 g of potassium hydroxide solution (45.5% in deionized water) and 100.2 g of deionized water until a homogeneous 10% polymer solution was obtained. The pH of the polymer solution was 9.2.

100 g of the polymer solution was mixed with 20 g of FW18 carbon black (Degussa Corp., Allendale, N.J.) and 80 g of deionized water and stirred mechanically for 0.5 hour. The mixture was then processed with a microfluidizer (Microfluidics Corp., Watham, Mass.) by passing it through the interaction chamber 5 times under a liquid pressure of about 10,000 psi. The resulting pigment dispersion had 10% pigment concentration with an average particle size of 110 nm as determined by Brookhaven BI-90 particle sizer.

Print Test

Inks 1–3 for use in ink jet printers were prepared by diluting the Black Pigment Concentrates 1–3. The weight percent of the components in the diluted ink concentrations are illustrated in Table 1.

TABLE 1

| INGREDIENT | WT % |
| --- | --- |
| Carbon Black, FW18 | 3.00[a] |
| Black Pigment Concentrate | 1.50 |
| 2-Pyrrolidone (Aldrich Chemical Co., Milwaukee, WI) | 5.0 |
| N-Methylpyrrolidone (Aldrich Chemical Co., Milwaukee, WI) | 2.0 |
| Liponic EG-1 (Lipo Chemicals Inc., Paterson, NJ.) | 4.25 |
| Zonyl FSA (DuPont Co., Wilmington, DE) | 0.05 |
| Proxel G (Zeneca Inc., Wilmington, DE) | 0.24 |
| Deionized water | 84.6 |

Inks 2 and 3 had 2.75% of carbon black and 1.38% of dispersant polymer??????.

Inks 1–3 were filled into a thermal ink jet pen and printed with a Hewlett Packard DeskJet ink jet printer (Hewlett Packard Co., Palo Alto, Calif.) on Gilbert bind paper (25% cotton, Mead Co., Dayton, Ohio). The printer was set to print two large, filled square having the side walls of approximately 2 inches. All inks printed smoothly and exhibited sharp edges based on visual inspection. The optical density of the inks is illustrated in Table 2.

Particle Size Test

The determination of the insoluble particle size in an ink, provides an indication of the stability of the ink (i.e, the ability of an ink to maintain itself as a dispersion over a duration of time). The inks of the present invention were subjected to 4 temperature cycles, each consisting of 4 hours at −20° C. and 4 hours at 70° C. The insoluble particle size in each ink was measured prior to and after the four temperature cycles using the BI-90 Brookhaven particle sizer. The change in particle size was measured as delta nm and is illustrated in Table 2.

TABLE 2

| Ink | Optical Density | T-cycle (Delta nm) |
| --- | --- | --- |
| 1 | 1.46 | 0 |
| 2 | 1.62 | 3 |
| 3 | 1.43 | 4 |

All inks including the control ink (Ink 1) were stable after the temperature cycle test.

Waterfastness Test

Waterfastness of inks 1–3 was determined by dripping water over ink printed on paper (i.e, one hour after the paper was released from the ink jet printer, as described in Print Test 1). Ink1 smeared while Inks 2 and 3 became 100% waterfast within approximately 2 minutes. Ink 1 became water fast after about 10 hours after printing.

Mechanical Smear Test

The Mechanical Smear Test was conducted by printing inks 1–3 onto a piece of paper as described in Print Test 1. Next, the writing end of a highlighter was rubbed across the printed ink to determine if one or more of the inks would smear. The experimental inks (2 and 3) exhibited improved resistance to the highlighter compared to ink 1. This Mechanical Smear Test is a more demanding test than the Waterfastness Test in that the composition of a highlighter ink may be alkaline and the highlighter is mechanically moved across the printed ink.

The complete disclosure of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A block copolymer dispersant comprising a hydrophobic block and a hydrophilic block, the hydrophilic block comprising at least one polymerized monomer containing a primary amine functionality and at least one polymerized monomer containing a carboxylic acid functionality.

2. The block copolymer dispersant according to claim 1, wherein the hydrophilic block comprises about 10 mole percent to about 50 mole percent of the polymerized monomer including a primary amine functionality.

3. The block copolymer dispersant according to claim 1, wherein the polymerized monomer containing a carboxylic acid functionality comprises acrylic acid, methacrylic acid, crotonic acid, itaconic acid, itaconic acid monoester, maliec acid, maliec acid monoester, fumaric acid, fumaric acid monoester, and combinations thereof.

4. The block copolymer dispersant according to claim 1, wherein the polymerized monomer including a primary amine functionality is selected from the group consisting of aminoalkyl acrylates, aminoalkyl methacrylates, and combinations thereof.

5. The block copolymer dispersant according to claim 1, having an AB structure consisting of the hydrophilic block and the hydrophobic block.

6. The block copolymer dispersant according to claim 1, having an ABC structure consisting of the hydrophilic block, the hydrophobic block, and a tuning block, the hydrophobic block is interposed between the hydrophilic block and the tuning block.

7. The block copolymer dispersant according to claim 1, having an ABA structure consisting of the hydrophilic block, the hydrophobic block, and a second hydrophilic block, the hydrophobic block is interposed between the hydrophilic block and the second hydrophilic block.

8. The block copolymer dispersant of claim 6, wherein the tuning block comprises at least one polymerized monomer comprising the general formula $$CH_2=C(R_3)(C(O)OX_n(CH_2CH_2O)_m)-R_4$$

wherein n=0 or 1; when n=1, X is an alkyl, aryl, or alkylaryl diradical connecting group of 1–9 carbon atoms; m=1–50, $R_3$ is H or $CH_3$, and $R_4$ is selected from the group consisting of H and alkyl group of 1–4 carbon atoms.

9. The block copolymer dispersant according to claim 1, wherein the hydrophilic block comprises at least one polymerized monomer comprising the general formula:

$$CH_2=C(R_3)(C(O)OX_n(CH_2CH_2O)_m)-R_4$$

wherein n=0 or 1; when n=1, X is an alkyl, aryl, or alkylaryl diradical connecting group of 1–9 carbon atoms; m=1–50, $R_3$ is H or $CH_3$, and $R_4$ is selected from the group consisting of H and alkyl group of 1–4 carbon atoms.

10. The block copolymer polymer dispersant according to claim 1, wherein the hydrophobic block comprises at least one polymerized monomer comprising the general formula:

$$CH_2=C(R_3)(C(O)OX_n(CH_2CH_2O)_m)-R_4$$

wherein n=0 or 1; when n=1, X is an alkyl, aryl, or alkylaryl diradical connecting group of 1–9 carbon atoms; m=1–50, $R_3$ is H or $CH_3$, and $R_4$ is selected from the group consisting of H and alkyl group of 1–4 carbon atoms.

11. The block copolymer dispersant according to claim 1, wherein the polymer dispersant is neutralized with a base.

12. A block copolymer dispersant comprising a hydrophobic block and a hydrophilic block, wherein the hydrophilic block comprises at least one polymerized monomer including a primary amine functionality.

* * * * *

UNITED STATES PATENT AND TRADEMARK OFFICE
CERTIFICATE OF CORRECTION

PATENT NO. : 6,306,994 B1 Page 1 of 1
DATED : October 23, 2001
INVENTOR(S) : Hertler Walter R. et al.

It is certified that error appears in the above-identified patent and that said Letters Patent is hereby corrected as shown below:

Column 14,
Line 48, "including" should be -- containing --

Signed and Sealed this

Twentieth Day of July, 2004

JON W. DUDAS
*Acting Director of the United States Patent and Trademark Office*